Sept. 28, 1954          J. LAIBOW          2,690,501
VAPORIZER FOR INSECTICIDES AND THE LIKE
Filed Oct. 7, 1952
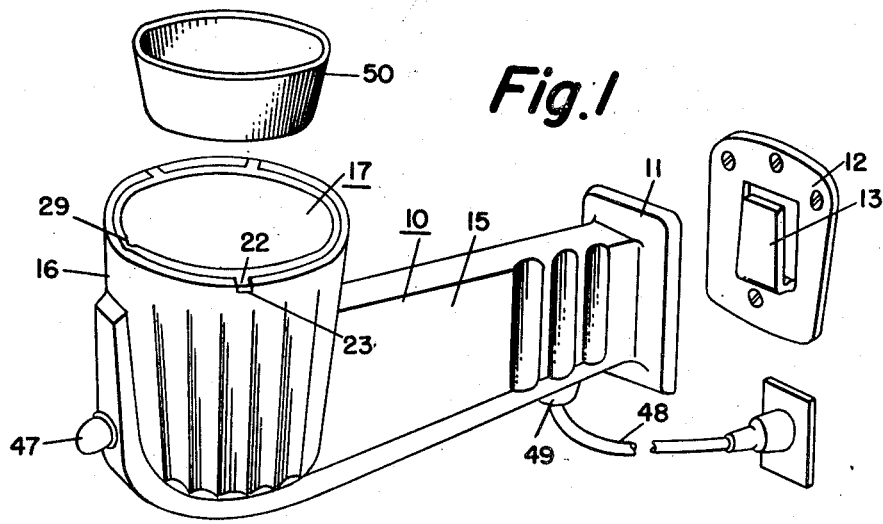
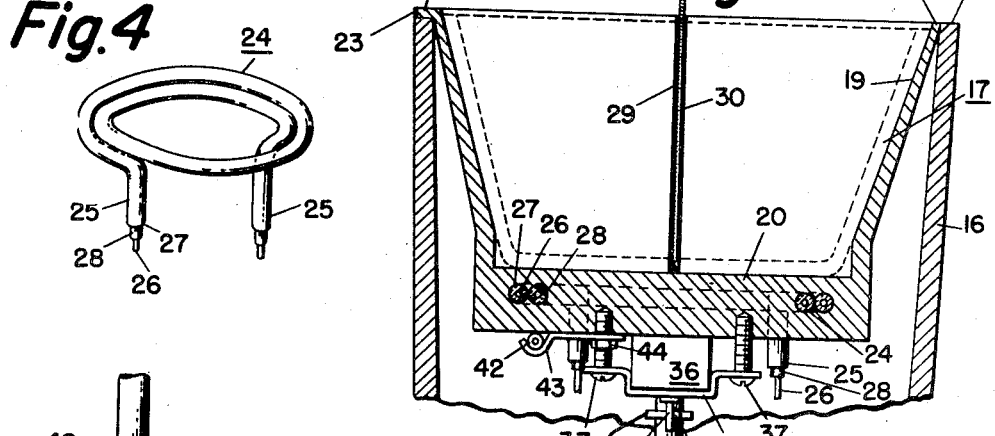
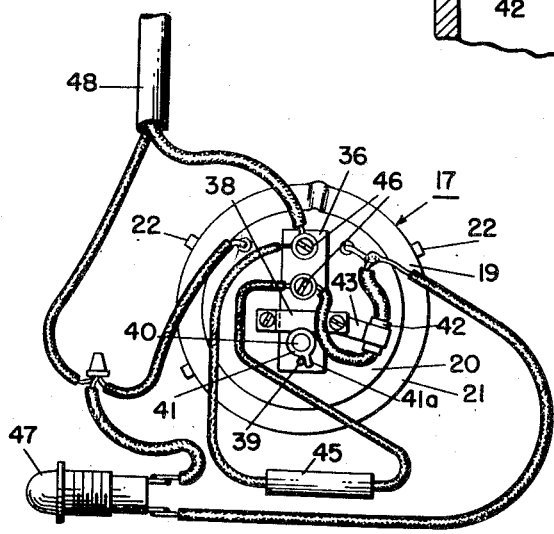
INVENTOR.
JULES LAIBOW
BY Arthur N. Klein
ATTORNEY Patented Sept. 28, 1954

2,690,501

UNITED STATES PATENT OFFICE 2,690,501

VAPORIZER FOR INSECTICIDES
AND THE LIKE

Jules Laibow, Merchantville, N. J., assignor to Cardinal Chemical Corporation, Philadelphia, Pa., a corporation of Pennsylvania Application October 7, 1952, Serial No. 313,436

1 Claim. (Cl. 219—44)

The present invention relates generally to vaporizers for insecticides and the like and it relates more particularly to insecticide-vaporizers of the type wherein a thermostatically-controlled electrical heating element maintains the temperature within a given range so as to cause vaporization of the insecticide at a predetermined rate.

An object of the present invention is to provide a new and improved vaporizer for insecticides and the like. Another object of the present invention is to provide a novel insecticide-vaporizer which is simple and easy to manufacture, relatively inexpensive and yet accurate and dependable in operation, and so constructed that those parts which have a tendency to fail upon prolonged use or through accident can be readily removed and replaced. Still another object of the present invention is to provide an improved insecticide-vaporizer in which a removable heating-unit is provided with an electrical heating-element which is permanently embedded therewithin when the heating-unit is cast, so as to form a more or less unitary one-piece structure.

Other objects and advantages of the present invention are apparent in the following detailed description, appended claim and accompanying drawings.

It has been known for many years that rooms can be kept free of flies, mosquitoes and other insects, without harmful effects upon humans or domestic animals, by spraying or vaporizing therein such insecticides as DDT and lindane (which is the purified gamma isomer of hexachlorocyclohexane). It has also long been known that a particularly effective way to vaporize these insecticides is to heat them at a relatively moderate temperature so as to cause the materials, which are relatively non-volatile solids at room temperature, to vaporize gradually in the form of an aerosol, thereby giving sufficiently high concentrations in the air to be lethal to insects while being harmless to humans and animals and without contamination of foods being stored, prepared or served in the room.

In my co-pending application, Serial No. 232,539, filed June 20, 1951, now Patent No. 2,616,024 granted October 28, 1952, I have shown one type of insecticide-vaporizer which has proven effective in the controlled vaporization of these aerosol-type insecticides.

According to the present invention, I have perfected a further-improved electrically-operated vaporizer for insecticides and the like, wherein the structure has been simplified to reduce cost of manufacture and, at the same time, has been made more dependable and effective in operation.

For the purpose of illustrating the invention, there is shown and described herein one embodiment which has been found in practice to give satisfactory results and which is presently preferred; it being understood, however, that the invention is not limited to the precise arrangements and instrumentalities disclosed.

Referring to the accompanying drawings in which like reference characters indicate like parts throughout:

Figure 1 is a perspective view of an insecticide-vaporizer constituting one embodiment of the present invention, the insecticide-containing cup or dish being shown in removed position.

Figure 2 is an enlarged fragmentary view, in vertical cross-section, taken generally along the line 2—2 of Fig. 1.

Figure 3 is a more or less schematic bottom plan view of the heating-unit of Fig. 2.

Figure 4 is a perspective view of the heating-element, as it appears prior to being incorporated into the heating-unit.

According to one embodiment of the present invention, shown generally in Fig. 1, I may provide a more or less integrally formed housing of metal or other suitable material, indicated generally by the reference character 10, and containing various features of ornamentation which are the subject of my Design Letters Patent D-164,242, granted August 14, 1951.

The housing 10 includes a generally flat end-portion 11 which is adapted to be mounted upon a wall or other vertical supporting surface in any suitable manner, as for example by means of a wall-plate 12 having an upwardly directed and tapered tongue 13 of trapezoidal cross-section adapted to make detachable engagement with a correspondingly shaped undercut groove formed in the end-portion 11, as more fully described in my aforesaid Patent 2,616,024.

The housing 10 also includes a hollow arm 15 which extends generally horizontally from the end-portion 11 and a hollow, open-top, downwardly-tapered bowl 16, formed at the outer end of, and communicating with, the hollow arm 15.

Disposed within the bowl 16 is a heating-unit indicated generally by the reference character 17, the heating-unit being supported upon the upper peripheral rim 18 of the bowl 16, in a manner to be more fully described hereinbelow, and depending therefrom within the upper portion of the bowl, as indicated in Fig. 2.

The heating-unit is a generally cup-shaped member of metal or the like which is cast or otherwise more or less integrally formed and includes a downwardly-tapered annular wall 19 and a relatively thick flat circular bottom 20, as best shown in Fig. 2. The rim 21 of the wall 19 is provided with a plurality (for example three) of radially outwardly extending, peripherally spaced lugs 22, which fit into corresponding notches 23 formed in the rim 18 of the bowl 16 and serve to support the heating-unit within the bowl.

A generally helical heating-element 24, best illustrated in Fig. 4, is embedded within the bottom 20 of the heating-unit 17, the ends 25 of the heating-element being bent downward and protruding somewhat below said bottom, as indicated in Fig. 2. The heating-element 24 is made up of a central core 26 of electrically conducting heat-generating material, an outer metallic sheath 27, and an annular intervening layer 28 of electrically insulating but heat-conducting material.

The heating-element 24 is more or less permanently embedded within the bottom 20, which is preferably cast in-situ about the heating-element; the heating-unit preferably being formed of an alloy or the like having an appreciably lower melting-point than the metallic sheath 27, and having relatively great heat conductivity, so that heat generated within the bottom 20 by the heating-element 24 is, to a considerable extent, conducted up the annular wall 19 as well.

The annular wall 19 is provided with a generally vertical groove 29 along its inner surface, the groove 29 being constructed and arranged to receive a thermometer 30, so as to permit reading of the temperature within the heating-unit 17.

A thermostat 36, of conventional construction, is fastened to the underside of the bottom 20 in any suitable maner, as for example, by a pair of spaced bolts 37 disposed on opposite sides of the thermostat and carrying a cross-piece 38 underlying the thermostat and suitably apertured to receive the bolts; the bolts being screw-threadedly-engaged within appropriate openings tapped in the bottom 20, as best shown in Fig. 2.

The thermostat 36 is provided with an adjusting screw 40, which can be rotated to change the setting of the thermostat. Where the vaporizer is intended to be used with a particular insecticide, the adjusting screw 40 can be pre-set, after calibration, to give the desired optimum temperature and can then be locked at that setting by affixing thereto a locking-collar 41 having a small extension 41-a, which contacts a vertical pin 39 mounted on the thermostat housing and thereby prevents rotation of the screw. The locking-collar is preferably secured to the adjusting screw 40 by solder or wax or other heat-fusible material, which can be readily melted to permit removal of the locking-collar and re-adjustment of the thermostat, where necessary.

A thermal fuse 42 is also mounted upon the underside of the bottom 20 in any suitable manner, as for example by a spring clamp 43 mounted on one of the bolts 37 and held tightly against the bottom 20 by a nut 44.

A condenser 45 is connected across the terminals 46 of the thermostat 36 to eliminate sparking and radio interference.

Mounted at the front of the housing 10 is a signal lamp 47, which is connected in series with the heating-element, so that it is lit when the heating-circuit is closed. Thus, it is possible to tell at a glance whether or not the vaporizer is in operation.

The vaporizer is provided with a conventional electric-cord 48, which can be plugged into any electrical outlet, as indicated in Fig. 1, and which passes into the arm 15 of the housing 10, through a bushing 49 provided at the bottom of the arm 15, adjacent the rear end-portion 11. The electric-cord 48 extends through the arm 15 and into the lower end of the bowl 16, at which point leads run from the individual wires of the electric-cord to the terminals of the thermostat and the heating-element, as indicated more or less schematically in Fig. 3. As shown in Fig. 3, the thermal fuse 42 is connected in series between the thermostat 36 and the heating-element, so that excessively high temperature will blow out the fuse and break the circuit, shutting off the vaporizer until the thermostat setting is corrected and a new fuse installed.

A cup-shaped dish 50, of heat-resistant glass or other suitable material, is adapted to be removably positioned within the heating-unit 17, and to hold the insecticide being heated and vaporized. The dish 50 is constructed and arranged to fit snugly within the heating-unit, the downwardly-tapered annular wall of the dish bearing against the annular wall 19, with the bottom of the dish resting upon the bottom 20 of the heating-unit 17.

The relatively high heat-conductivity of the comparatively thick-walled cast metal heating unit causes the annular wall 19 to be heated to more or less the same degree as the bottom 20 of the heating-unit, and results in generally uniform heating of the insecticide-containing dish 50, at the sides as well as the bottom thereof. This results in more efficient and uniform vaporization of the insecticide and permits use of a lower maximum temperature setting than would be necessary if only the bottom of the dish were heated. This uniform heating also minimizes temperature fluctuations of the insecticide resulting from drafts and other changes in the ambient air of the room in which the vaporizer is installed.

The vertical groove 29 in the annular wall 19 of the heating-unit 17 permits insertion of the thermometer 30 intermediate the wall 19 and the dish 50. In this way, it is possible to check the operating temperature of the vaporizer, from time to time, to make sure that the thermostat is functioning properly and, if necessary, to make appropriate adjustments.

The heating-unit 17 can be lifted out of the bowl 16 to expose the various parts mounted on its underside, so as to give ready access to the thermostat adjusting screw 40, and also to permit easy replacement of the thermostat, the thermal fuse and/or the condenser.

From the foregoing, it is apparent that the novel vaporizer of the present invention can be quickly, easily and inexpensively manufactured of readily available materials and parts.

Thus, the housing 10 may be formed inexpensively from light-weight aluminum alloy or other suitable material, as for example by die-casting left and right longitudinal half-sections and welding or otherwise suitably securing them together into a more or less integral unit.

The heating-unit can be simply formed by casting, as described above, with the heating-element embedded therewithin during the casting operation.

The heating-element can be easily formed from commercially available stock, by simple bending operations.

The dish 50, the thermostat, the thermal fuse, the condenser and the signal lamp can all be standard elements, purchasable on the open market, and their assembly can be effected with minimum labor cost due to the accessibility of their disposition within the complete structure.

The rugged construction and the sealed-in disposition of the heating-element makes for far greater dependability and longer life than conventional heating-elements, employing resistance wires disposed upon or within relatively frangible ceramic cores or bodies. As a result, the novel insecticide vaporizer of the present invention is far superior in performance than conventional constructions heretofore employed.

Should the heating-unit be damaged, due to mishandling or the like, it can be replaced, quickly and inexpensively, by another complete unit.

The present invention can be embodied in other specific forms and, accordingly, the present embodiment is to be considered merely as illustrative and not restrictive, reference being made to the appended claim, rather than to the foregoing description, as indicating the scope of the invention.

Having thus described my invention, I claim as new and desire to protect by Letters Patent:

In a vaporizer for insecticides or the like, a housing having a generally upright open-top bowl, and a generally cup-shaped heating-unit removably mounted within the upper portion of said bowl, said heating-unit being integrally formed of cast metal or the like having relatively high heat-conductivity, said heating-unit having a self-contained electrical heating-element permanently embedded within its bottom, said heating-element comprising a generally horizontally disposed helical coil having a central core of electrically-conducting heat-generating material, an outer metallic sheath, and an annular intervening layer of electrically-insulating but heat-conducting material, said heating-element having terminals protruding downward within said bowl from the underside of the heating-unit to facilitate the making of electrical connections to said heating-element, said heating-unit having a thermostat detachably mounted directly upon the underside of its bottom and operatively connected within the electrical circuit to the heating-element so as to regulate the temperature of the heating-unit.

References Cited in the file of this patent

UNITED STATES PATENTS

| Number | Name | Date |
|---|---|---|
| 1,359,000 | Stottmeister | Nov. 16, 1920 |
| 1,982,358 | Smith | Nov. 27, 1934 |
| 2,541,637 | Christopher et al. | Feb. 13, 1951 |
| 2,571,782 | Swenson | Oct. 16, 1951 |
| 2,597,695 | Braski et al. | May 20, 1952 |
| 2,616,024 | Laibow | Oct. 28, 1952 |
| 2,667,567 | Buehler | Jan. 26, 1954 |
| 2,675,293 | Baker | Apr. 13, 1954 |

OTHER REFERENCES

"Electric Heaters and Heating Devices"; December 1941 GED-650B; General Electric Co., Schenectady, N. Y., p. 33.